(12) United States Patent
Kawai et al.

(10) Patent No.: US 7,400,827 B2
(45) Date of Patent: Jul. 15, 2008

(54) CAMERA PROVIDED WITH OPTICAL FINDER

(75) Inventors: Sumio Kawai, Hachioji (JP); Yoichi Washizu, Kokubunji (JP); Koji Kato, Tama (JP); Shigeru Iwase, Akishima (JP); Hiroshi Terada, Mitaka (JP); Shigeru Kato, Tachikawa (JP)

(73) Assignee: Olympus Corporation, Tokyo (JP)

( * ) Notice: Subject to any disclaimer, the term of this patent is extended or adjusted under 35 U.S.C. 154(b) by 504 days.

(21) Appl. No.: 11/212,929

(22) Filed: Aug. 26, 2005

(65) Prior Publication Data
US 2006/0045513 A1    Mar. 2, 2006

(30) Foreign Application Priority Data
Aug. 31, 2004    (JP)    ............... 2004-253315

(51) Int. Cl.
*G03B 7/099*    (2006.01)

(52) U.S. Cl. .................. 396/272; 396/268; 396/271; 396/355; 396/356; 396/358; 396/373; 396/386; 359/214; 359/839; 359/850; 348/333.09; 348/341; 348/343; 348/344

(58) Field of Classification Search ............... 396/355, 396/356, 358, 373, 386, 268, 271, 272; 359/214, 359/839, 850; 348/341, 333.09, 343, 344
See application file for complete search history.

(56) References Cited

U.S. PATENT DOCUMENTS

| | | | | |
|---|---|---|---|---|
| 4,119,982 A | * | 10/1978 | Imura et al. | 396/354 |
| 4,571,630 A | * | 2/1986 | Tamagawa et al. | 348/343 |
| 4,623,932 A | * | 11/1986 | Inoue et al. | 348/350 |
| 5,459,511 A | * | 10/1995 | Uehara et al. | 348/335 |
| 5,734,428 A | * | 3/1998 | Suda et al. | 348/341 |
| 5,737,648 A | * | 4/1998 | Ejima et al. | 396/276 |
| 5,953,546 A | * | 9/1999 | Okada et al. | 396/272 |

(Continued)

FOREIGN PATENT DOCUMENTS

JP    06-130457    5/1994

(Continued)

OTHER PUBLICATIONS

Chinese Office Action for Application No. 2005100938376, dated Jan. 12, 2007 (5 pgs.) with Translation of Text of Office Action (4 pgs.).

*Primary Examiner*—W. B. Perkey
*Assistant Examiner*—Michael A Strieb
(74) *Attorney, Agent, or Firm*—Straub and Pokotylo; John C. Pokotylo

(57) ABSTRACT

According to the present invention, light from a taking lens is reflected by a quick return mirror in a lateral direction of a body unit. Then, after passing through a screen, the light is reflected toward an upper side of the body unit by a second mirror except part of the light. The light reflected by the second mirror is reflected by a third mirror in a direction opposite to a direction in which the light is reflected by the quick return mirror, and is further reflected by a fourth mirror toward an eyepiece located on a back side of the body unit. Part of the light which passing though the screen is taken by an AF sensor unit provided in rear of the second mirror, and an image formation position of an optical image is detected.

23 Claims, 5 Drawing Sheets

U.S. PATENT DOCUMENTS

2005/0174464 A1* 8/2005 Iwase et al. .................. 348/335
2007/0264005 A1* 11/2007 Haubmann .................. 396/386

FOREIGN PATENT DOCUMENTS

| JP | 07-287160 | 10/1995 |
| JP | 2001-016485 | 1/2001 |
| JP | 2001-033849 | 2/2001 |

* cited by examiner

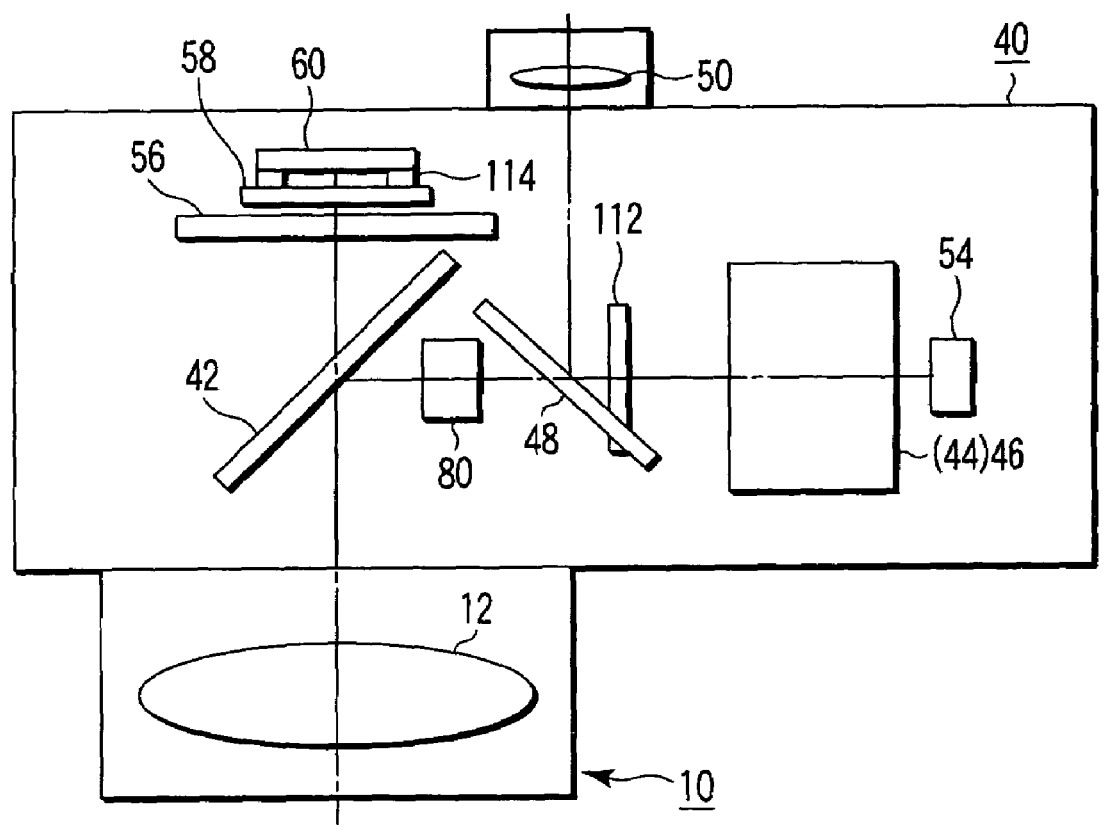
F I G. 6

CAMERA PROVIDED WITH OPTICAL FINDER

CROSS-REFERENCE TO RELATED APPLICATIONS

This application is based upon and claims the benefit of priority from prior Japanese Patent Application No. 2004-253315, filed Aug. 31, 2004, the entire contents of which are incorporated herein by reference.

BACKGROUND OF THE INVENTION

1. Field of the Invention

The present invention relates to a camera provided with an optical finder, and in particular arrangement of an autofocus detecting unit, a photometry unit for measuring exposure and an image pickup unit for use in a finder optical system.

2. Description of the Related Art

Conventionally, a single-lens reflex camera using a roof prism is generally applied to a structure using a TTL type finder, an autofocus detecting unit, a photometry unit for exposure and a finder function. Such a single-lens reflex camera comprises, e.g., a quick return mirror which is rotatable in a vertical direction, a screen located above the quick return mirror, a roof prism located above the screen, and an eyepiece located in rear of the roof prism.

Furthermore, in the above structure, an optical path is bent downwards by a sub-mirror located in rear of the quick return mirror, and a mechanism for detecting autofocus is provided in a lower region of space where the quick return mirror. For example, an autofocus detecting unit and an image pickup unit disclosed in Jpn. Pat. Appln. KOKAI Publication No. 7-287160 and a photometry unit for exposure disclosed in Jpn. Pat. Appln. KOKAI Publication No. 6-130457 are known as the autofocus detecting unit, the image pickup unit and the photometry unit of the above single-lens reflex camera.

BRIEF SUMMARY OF THE INVENTION

The object of the present invention is to provide a small camera in which an AF photometry system, an AE photometry system and optical sensors such as an image pickup device for electronic image outputting are efficiently arranged in small space.

The present invention is featured in that a camera provided with an optical finder, comprises:

a taking lens;

a plurality of optical reflection surfaces which bend an optical axis of the taking lens at a substantially right angle to a longitudinal direction of the camera, and then further bend the optical axis of the taking lens a number of times, to thereby guide light traveling from the taking lens to an eyepiece, at least two of the plurality of optical reflection surfaces having light transmitting characteristics; and a plurality of optical sensors provided in rear of back sides of the at least two of the plurality of optical reflection surfaces which have the light transmitting characteristics.

According to the present invention, a small camera can be provided in which an AF photometry system, an AE photometry system and optical sensors such as an image pickup device for electronic image outputting are efficiently arranged in small space.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a plan view showing another modification of the embodiment of the present invention, and also how main structural members such as the image pickup unit 80 and a finder optical system in a camera according to the above other modification are arranged in the camera body as viewed from an upper side of the camera body.

DETAILED DESCRIPTION OF THE INVENTION

An embodiment of the present invention will be explained with respect to the accompanying drawings.

Figure 1:
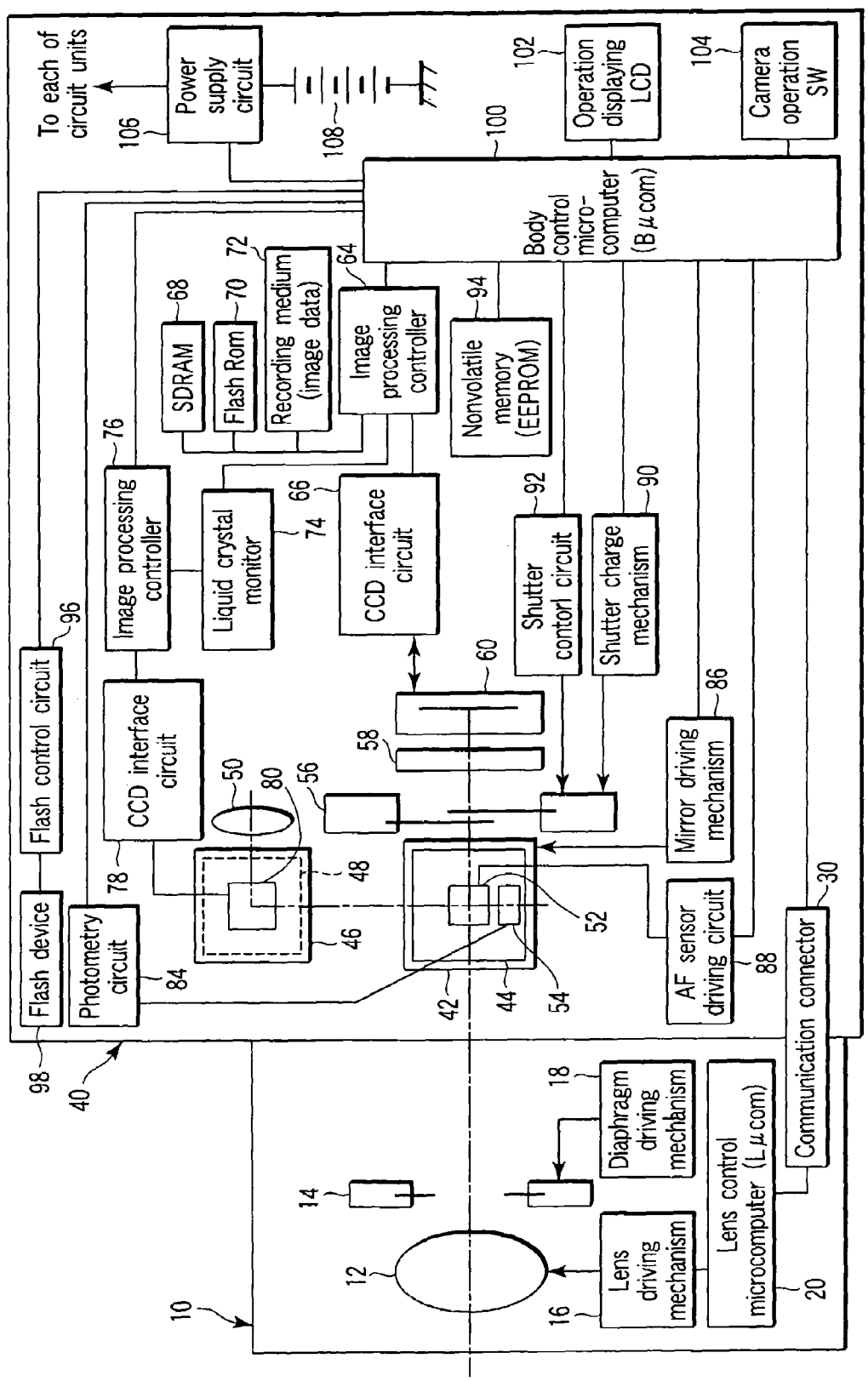
FIG. 1 is a block diagram of the system configuration of a camera according to an embodiment of the present invention.

FIG. 1 is a block diagram of a system configuration of a camera according to the embodiment of the present invention.

Referring to FIG. 1, the camera comprises a lens unit 10 serving as an interchangeable lens and a body unit 40 serving as a camera body, as its main structural portions. At the front surface of the body unit 40, a desired lens unit 10 is detachably set.

More specifically, the lens unit 10 can be detachably engaged with a lens mount not shown which is provided at the front surface of the body unit 40. The lens unit 10 comprises an a taking lens 12, a diaphragm 14, a lens driving mechanism 16, a diaphragm driving mechanism 18, and a lens control microcomputer (which will be referred to as Lμcom) 20.

The taking lens 12 is driven in its optical axial direction by a DC motor not shown which is provided in the lens driving mechanism 16. The diaphragm 14 is driven by a stepping motor not shown which is provided in the diaphragm driving mechanism 18. The Lμcom 20 controls driving of structural elements such as the lens driving mechanism 16 and the diaphragm driving mechanism 18, which are provided in the lens unit 10. The Lμcom 20 is electrically connected to a body control microcomputer (which will be hereinafter referred to as Bμcom) 100 which will be described later, by a communication connector 30, and is controlled in accordance with a command issued by the body controlling microcomputer 100.

The body unit 40 has the following structure:

When light from an object to be photographed (not shown) is incident onto the body unit 40 through the taking lens 12 and the diaphragm 14 in the lens unit 10, it is reflected by a quick return mirror 42 (first mirror) which is a movable mirror, and then reaches an eyepiece 50 of an ocular optical system through a finder optical system (see FIGS. 2 and 3) which includes a second mirror 44, a third mirror 46 and a fourth mirror 48, etc., and which will be described later.

Furthermore, after being reflected by the quick return mirror 42, part of the light from the object is transmitted through a screen 112 which will be described later, and is then guided to an AF sensor unit 52 and a photometry sensor 54 through the second mirror 44. The AF sensor unit 52 is designed to detect the state of the taking lens 12 with respect to focusing.

At a rear side (the right side of FIG. 1) of the quick return mirror 42, a focal-plane shutter 56, a low pass filter 58 and a CCD unit 60 are provided. The CCD unit is an optical/electrical conversion element for performing optical/electrical conversion on an image of the object which is transmitted as image data through the optical system. To be more specific, when the quick return mirror 42 is retreated from a photographing optical path, light passing through the taking lens 12 and the diaphragm 14 forms an image on an image formation surface of the CCD unit 60.

It should be noted that the longitudinal direction of an image formation range 60a (which will be described later) (see FIG. 3) of a CCD of the CCD unit 60 is coincident with that of the camera (body unit 40).

The body unit 40 includes an image processing controller 64 for performing image processing. To the image processing controller 64, a CCD interface circuit 66 connected to the CCD unit 60, an SDRAM 68 provided as a storage region, a flash-ROM 70, a recording medium 72, and a liquid crystal monitor 74, etc. are connected. These elements are structured to provide an electronic image pickup function and an electronic record displaying function. To the liquid crystal monitor 74, an image processing controller 76 is connected. To the image processing controller 76, an image pickup unit 80 is connected to through a CCD interface circuit 78. The image pickup unit 80 is provided in rear of the back of the third mirror 46, and will be described in detail later.

The recording medium 72 is an external recording medium removably loaded in the body unit 40, and corresponding to any of various kinds of memory cards or an external hard disk drive (HDD).

The image processing controllers 64 and 76 are connected to the Bµcom 100, which controls each of sections provided in the body unit 40. Also, the photometry sensor 54, a mirror driving mechanism 86, an AF sensor driving circuit 88, a shutter charge mechanism 90, a shutter control circuit 92, a nonvolatile memory (EEPROM) 94, and a flash device 98, etc. are connected to the Bµcom 100. Of those members, the photometry sensor 54 and a flash device 98 are connected to the Bµcom 100 through a photometry circuit 84 and a flash control circuit 96, respectively.

To the Bµcom 100, an operation displaying LCD 102 for displaying the operation state of the camera for a photographer, a camera operation switch (SW) 104 and a battery 108 are connected. Of these members, the battery 108 is connected to the Bµcom 100 via a power supply circuit 106.

The Bµcom 100 and the Lµcom 20 are electrically connected to each other by the communication connector 30 such that they can communicate with each other, when the lens unit 10 is engaged with the body unit 40. Further, in order that the camera operate as a digital camera, the Lµcom 20 dependently operates in cooperation with the Bµcom 100.

The photometry circuit 84 is a circuit for performing photometry processing on the basis of an electrical signal output from the photometry sensor 54. The mirror driving mechanism 86 is a mechanism (switching means) for driving and controlling the quick return mirror 42, and the AF sensor driving circuit 88 is a circuit for driving and controlling the AF sensor unit 52.

The shutter charge mechanism 90 is designed to charge springs for front and rear shutters of the focal-plane shutter 56. The shutter control circuit 92 controls movement of each of the front and rear shutters of the focal-plane shutter 56. Also, a signal for controlling the opening/closing operation of the shutter and a flash synchronizing signal are transmitted between the shutter control circuit 92 and the Bµcom 100.

The nonvolatile memory 94 is storage means for storing predetermined control parameters necessary for controlling the camera, and is provided as a storage region other than the SDRAM 68, the flash-ROM 70 and the recording medium 72. The nonvolatile memory 94 can be accessed by the Bµcom 100 and the Lµcom 20.

The flash device 98 includes a flash emission tube not shown, and is designed to emit a flash onto the object. The flash control circuit 96 performs a charging control for controlling supplying of a quantity of electric charge which is necessary for emission of the flash emission tube of the flash device 98, and also an emission control for controlling flash emission of the flash device 98.

The operation displaying LCD 102 is intended to display the operation state of the camera to inform a user of the operation state. The camera operation switch 104 gives an instruction for executing, e.g., a photographing operation, as switching means, and comprises a group of switches such as a release switch, a mode changing switch, a power switch and operation buttons for use in operating the camera. The release switch changes the position of the quick return mirror 42 between two positions where the quick return mirror 42 is located within the photographing optical path and where the quick return mirror 42 is not located within the photographing optical path, as described later. The mode changing switch effects switching between a photographing mode and an image displaying mode.

The power supply circuit 106 is provided to convert a voltage of the battery 108, which serves as a power supply, into a voltage necessary for each of circuit units in the camera system of the camera, and then apply the obtained voltage to each circuit unit.

Next, the finder optical system will be explained with reference to FIGS. 2 and 3.

Figure 2:
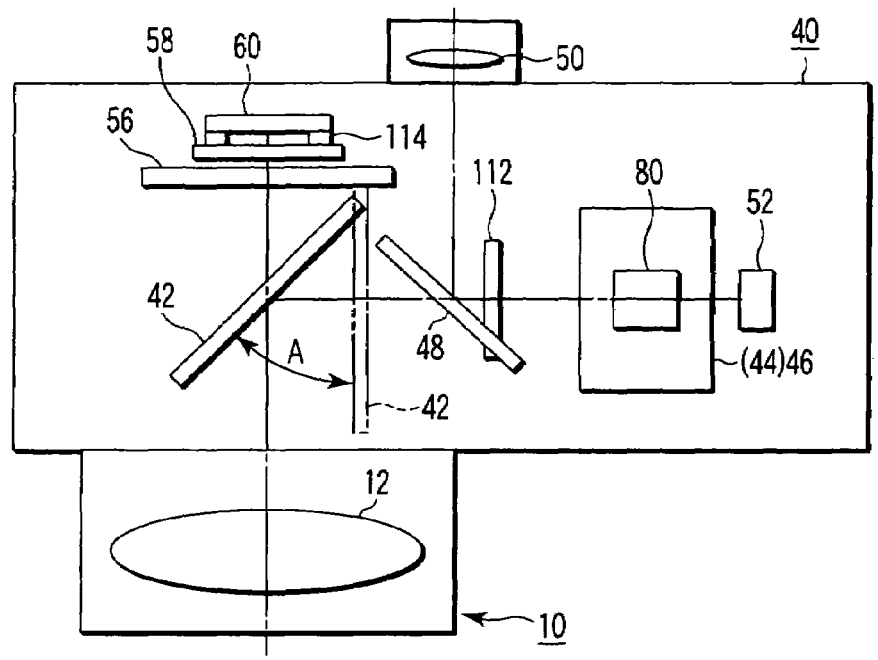
FIG. 2 is a plan view showing a camera body in which main structural members of the camera according to the embodiment of the present invention e.g., a finder optical system and an image pickup unit 80 are set in the camera body as viewed from an upper side of the camera body.
Figure 3:
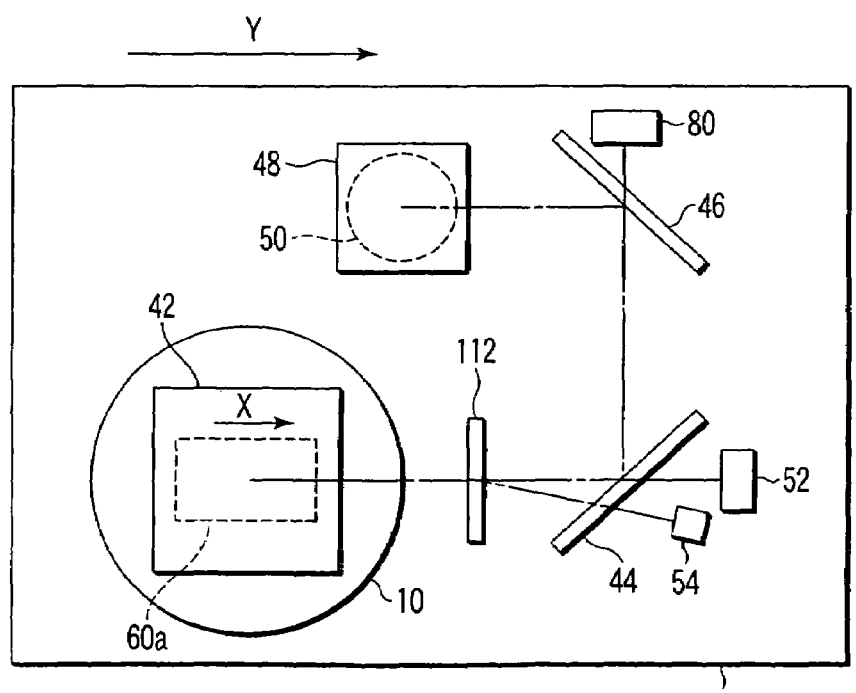
FIG. 3 is a front view showing the camera body in which the main structural members of the camera according to the embodiment of the present invention, such as the finder optical system and the image pickup unit 80, are set in the camera body as viewed from a taking lens side.

FIGS. 2 and 3 each show a finder observation state in the embodiment of the present invention. To be more specific, they show arrangement of main structural members of the finder optical system and the AF sensor unit 52, which are set in the camera body. FIG. 2 is a plan view showing the structural members as viewed from the upper surface side of the camera body, and FIG. 3 is a front view showing the structural members as viewed from the taking lens side.

The following explanation will be given on the premise that in an operation state of the camera, i.e., at a photographing time of the camera, the orientation of the camera when the photographer gets ready with the camera will be referred to as horizontal orientation, and a longitudinal direction X of the image formation range 60a of the CCD of the CCD unit 60 and a longitudinal direction Y of the body unit 40 are made coincident with that of a visual field range of the finder.

The finder optical system comprises a screen 112 and a plurality of mirrors, i.e., the quick return mirror 42 (first mirror), the second mirror 44, the third mirror 46, and the fourth mirror 48, which guide light transmitted from the object through the taking lens 12 in the lens unit 10 to the eyepiece 50. The quick return mirror 42 includes a first reflection surface (first optical reflection surface), and the second mirror 44, the third mirror 46 and the fourth mirror 48 include a second reflection surface (second optical reflection surface), a third reflection surface (third optical reflection surface) and a fourth reflection surface (fourth optical reflection surface), respectively.

The second mirror 44 and the third mirror 46 are each formed of a half mirror. It should be noted that an optical member which permits light to pass through the optical member at a predetermined rate is referred to as a half mirror or a semi-transmission mirror, and the percentage of part of light which is permitted to pass through the half mirror is not limited to 50%, e.g., the half mirror may permit 30% of light to be transmitted through it.

The light transmitted from the object through the taking lens 12 reaches the quick return mirror 42 which is the first mirror, i.e., the movable mirror as stated above. To be more specific, the quick return mirror 42 is a first reflection member which is rotatable in either of the directions indicated by the double-headed arrow in FIG. 2. At the time of observing the object, between the taking lens 12 and the CCD unit 60, the quick return mirror 42 is located within the photographing optical path (observation position) of the taking lens 12 as indicated by a solid line in FIG. 2. At the time of photographing the object, the quick return mirror 42 is moved by the mirror driving mechanism 86 to a retreat position, i.e., a photographing position, which is indicated by a chain double-dashed line in FIG. 2, that is, it is retreated from the photographing optical path, as a result of which the light from the object is guided to the CCD unit 60 through the low pass filter 58.

Referring to FIG. 2, a member denoted by reference numeral 114 is a seal member for sealing the gap between the CCD unit 60 and the optical low pass filter 58.

At the time of observing the object, when the light from the object is incident on the first reflection surface of the quick return mirror 42 through the taking lens 12, it is reflected by the first reflection surface at an angle of approximately 90° to the optical axis of the taking lens 12 to travel along the longitudinal direction Y of the body unit 40. That is, it is reflected to the right side of FIG. 2.

The light reflected from the first reflection surface of the quick return mirror 42 forms an image on the screen 112 located on a reflection optical path of the quick return mirror 42, which extends from the first reflection surface thereof. After forming the image on the screen 12, the light is transmitted through the screen 112, and is then reflected by the second mirror 44 which serves as a second reflection member. The second mirror 44 is located on the reflection optical path from the first reflection surface of the quick return mirror 42, and its reflection surface, i.e., the second reflection surface, is inclined at a predetermined angle with respect to the reflection optical path from the first reflection surface. When the light from the first reflection surface is incident on the second mirror 44, it is reflected at approximately 90° with respect to the reflection optical path from the first reflection surface. That is, the light reflected from the first reflection surface of the quick return mirror 42 is reflected from the second reflection surface of the second mirror 44 toward the upper side of the body unit 40 as shown in FIG. 3.

The light reflected from the second surface of the second mirror 44 is incident on the third mirror 46 serving as a third reflection member. The third mirror 46 is located on a reflection optical path of the second mirror 44, which extends from the second reflection surface thereof, and its reflection surface, i.e., the third reflection surface, is inclined at a predetermined angle with respect to the reflection optical path from the second reflection surface.

When the light from the second reflection surface is incident on the third mirror 46 serving as the third reflection member, it is reflected from the third reflection surface of the third mirror 46 at approximately 90° with respect to the reflection optical path from the second reflection surface. At this time, the light incident on the third mirror 46 is reflected in a direction opposite to the direction in which the light is reflected from the first reflection surface of the quick return mirror 42. That is, the light from the second reflection surface of the second mirror 44 is reflected by the third reflection surface of the third mirror 46 toward the left side of FIG. 3. In other words, the light reflected from the first reflection surface of the quick return mirror 42 is guided by the second mirror 44, and then by the third mirror 46, to travel in a direction opposite to the traveling direction of the light reflected from the first reflection surface of the quick return mirror 42. The reflection optical axis from the third reflection surface of the third mirror 46 is substantially parallel to that from the first reflection surface of the quick return mirror 42.

The light reflected from the third reflection surface of the third mirror 46 is incident on the fourth mirror 48. The fourth mirror 48 is provided as a fourth reflection member on the reflection optical axis from the third reflection surface, such that its reflection surface, i.e., the fourth reflection surface, is inclined at a predetermined angle with respect to the reflection optical axis from the third reflection surface.

When the light from the third reflection surface is incident on the fourth mirror 48 serving as the fourth reflection member, it is reflected thereby at approximately 90° with respect to the reflection optical axis from the third reflection surface. The light reflected from the third reflection surface of the third mirror 46 is reflected toward the rear side of the body unit 40 (i.e., the upper side of FIG. 2). The reflection optical axis from the fourth reflection surface is substantially parallel to the optical axis of the taking lens 12.

The light reflected by the fourth reflection surface of the fourth mirror 48 is incident on the eyepiece 50 located on the reflection optical axis from the fourth reflection surface.

In such a manner, the light transmitted from the object through the taking lens 12 is guided to the eyepiece 50 by the first to fourth reflection surfaces, such that an image formed by the light is reversed, thereby providing a correct image. As a result, the photographer can observe an image formed on the screen 112 with his or her eye through the eyepiece 50.

Furthermore, the AF sensor unit 52 is provided in rear of the back of the second mirror 44. As stated above, since the second mirror 44 is formed of a half mirror, part of the light guided to the screen 112 is transmitted through the second mirror 44, and is then incident on the AF sensor unit 52.

The AF sensor unit 52 is located to face the screen 112, and pupil-divides and guides an image formed by a secondary image forming lens to a photoelectric device. As a result, it functions as a phase-contrast type AF sensor unit.

It should be noted that the AF sensor unit 52 can achieve autofocus (AF) in a wide field of vision which covers the entire screen region, since it is located in rear of the back of the second reflection surface of the second mirror 44.

Similarly, the photometry sensor 54, which outputs an electrical signal to the light transmitted from the screen 112, is provided in a direction perpendicular to the reflection optical axis from the first reflection surface of the quick return mirror 42, and is located in rear of the back of the second reflection surface of the second mirror 44. On the basis of the electrical signal output from the photometry sensor 54, photometry processing is carried out by the photometry circuit 84.

It should be noted that the AF sensor unit 52 and the photometry sensor 54 are arranged in such a manner as to receive at least part of the light which is close to the optical axis of the taking lens 12.

In rear of the back of the third reflection surface of the third mirror 46, the image pickup unit 80 which includes an image pickup device not shown (also referred to as an image pickup sensor) is provided. Since the third mirror 46 is also formed of a half mirror, the light from the screen 112 is made to form an optical image by an optical system which performs secondary image formation. The formed optical image is subjected to photoelectric conversion in the image pickup unit 80, and then subjected to processing in the CCD interface circuit 66 and the image processing controller 64. Then, it is displayed by the liquid crystal monitor 74, which can function as a finder.

Furthermore, since the image pickup unit 80, as stated above, is located in rear of the back of the third mirror 46, it does not interfere with traveling of the light to the optical finder. Thus, both an optical finder display and an electronic display can be easily achieved.

As described above, in the case where a half mirror is provided in the finder optical system, and optical sensors are located in rear of the backs of the half mirrors, only part of the light incident on the taking lens 12 is guided to the eyepiece 50. Thus, an optical image which can be observed through the eyepiece 50 is darker than that in an optical finder for use in a structure having no half mirror. However, in order to observe an optical image, or adjust focusing of the taking lens, it is not necessary that 100% of the light is guided to the eyepiece 50. On the other hand, in order to increase the detection accuracy of each of the optical sensors, a larger amount of light needs to be guided to the eyepiece 50.

In the embodiment, the amount of the light guided to the eyepiece 50 is set to be smaller than 50% of the amount of light incident on the taking lens 12. In other words, 50% or more of the amount of light incident on the taking lens 12 is supplied to the optical sensors. Thus, in observation of an image using the optical finder and detection by the optical sensors, the detection accuracy of each of the optical sensors is not remarkably lowered, and it is not difficult to observe the image through the optical finder.

It should be noted that it suffices that how the light is distributed to the optical sensors is set by determining the transmittances of the half mirrors in accordance with the amounts of light which are respectively required for the optical sensors.

In the embodiment of the present invention, as shown in FIGS. 2 and 3, the quick return mirror 42, the second mirror 44, the second mirror 44, the third mirror 46 and the fourth mirror 48 are arranged such that each of these mirrors reflects light at approximately 90°. However, the arrangement of the mirrors is not limited to such arrangement.

In the camera system having the above structure, the structural members operate in the following manner:

The image processing controller 76 controls the CCD interface circuit 66 in response to a command from the Bµcom 100, and fetches image data from the CCD unit 60. The image data is converted into a video signal by the image processing controller 64, and is output and displayed as an image by the liquid crystal monitor 74. Thus, the user can check a picked-up image from the image displayed by the liquid crystal monitor 74.

The SDRAM 68 is a memory for temporarily storing image data, and is used as a work area, etc. in conversion of the image data. The image data is set to be stored in the recording medium 72 after being converted into JPEG data.

The optical low pass filter 58 is located in front of the CCD unit 60, and protects the CCD unit 60.

The mirror driving mechanism 86 is a mechanism for driving the quick return mirror 42 to move it to either the observation position or the retreat position, i.e., photographing position. When the quick return mirror 42 is located in the observation position, the light from the taking lens 12 is split into the AF sensor unit 52 and the finder side by the second mirror 44 which is a half mirror.

The output of the AF sensor in the AF sensor unit 52 is transmitted to the Bµcom 100 through the AF sensor driving circuit 88, and then well-known photometry processing is carried out.

Furthermore, the user can view the object through the eyepiece located adjacent to the fourth mirror 48.

On the other hand, part of the light forming an image at the screen 112 after passing through the second mirror 42 is guided to the photometry sensor 54, and well-known photometry processing is carried out by the photometry circuit 84 based on the amount of light which is detected by the photometry sensor 54.

Figure 4:
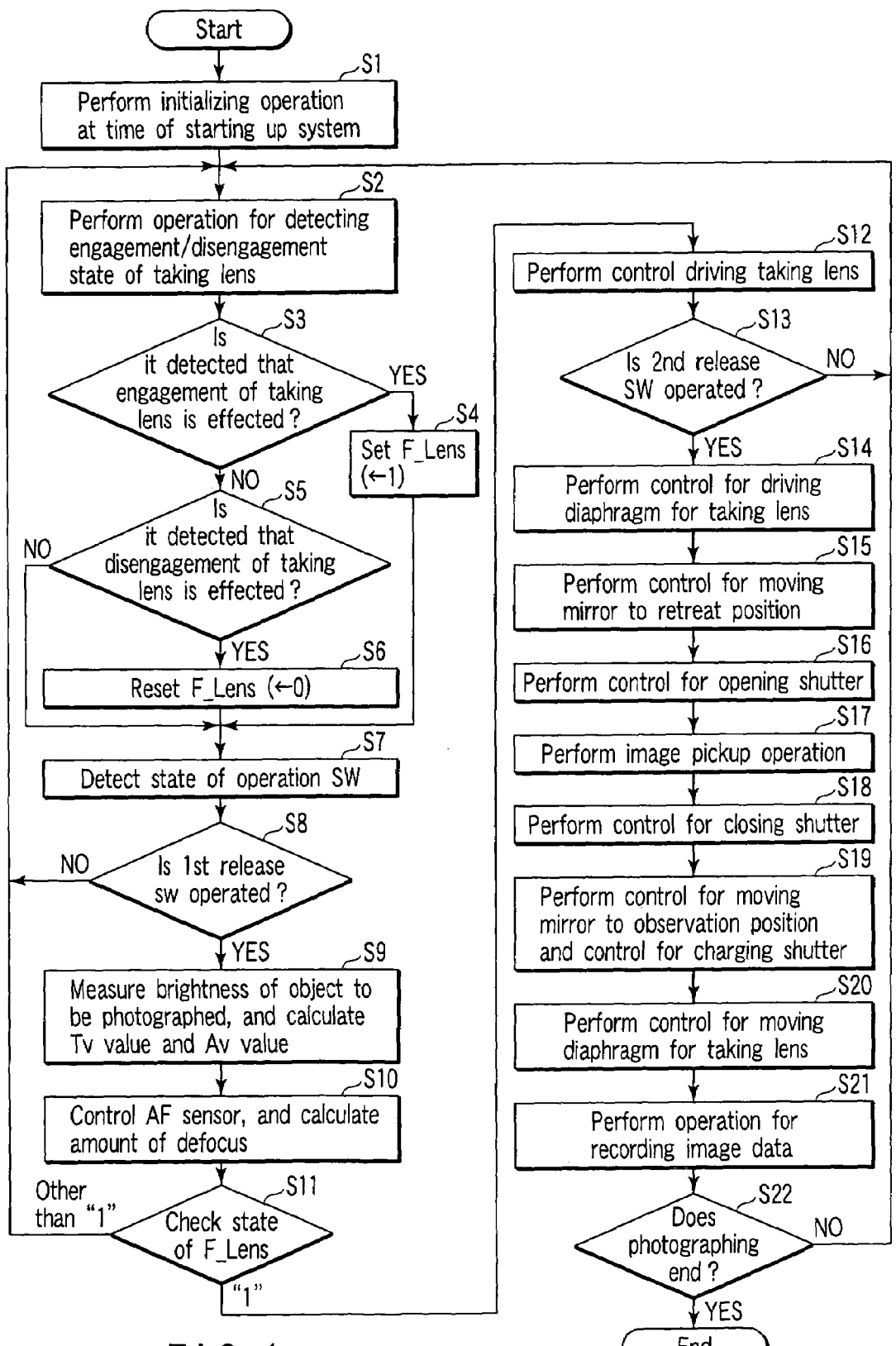
FIG. 4 is a flowchart for use in explaining a control operation of a body control microcomputer (Bμcom) 100.

The control operation of the Bµcom 100 will be explained with reference to the flowchart of FIG. 4.

First, when a power switch is turned on, the Bµcom 100 starts to operate. Then, in step S1, processing for starting up the camera system is executed. At this time, the power supply circuit 106 is controlled such that power is supplied to each of the circuit units in the camera system. Also, each of the circuits is initialized.

Step S2 is a step to be periodically carried out. In this step, the Bµcom 100 communicates with the Lµcom 20, thereby detecting the state of the lens unit 10. Then, in step S3, it is determined whether the lens unit 10 is engaged with the body unit 40 or not. When it is determined that the lens unit 10 is engaged with the body unit 40, the step to be carried out proceeds to step S4. When it is determined that the lens unit 10 is not engaged with the body unit 40, the step to be carried out proceeds to step S5.

In step S4, control flag F_Lens is set (to "1"). This flag indicates "1" when the lens unit 10 is engaged with the body unit 40, and indicates "0" when the lens unit 10 is disengaged from the body unit 40. After the flag is set, the step to be carried out proceeds to step S7.

On the other hand, in step S3, when it is determined whether the lens unit 10 is not engaged with the body unit 40, as described above, the step to be carried out proceeds to step 5. In step 5, it is determined whether or not the lens unit 10 is disengaged from the body unit 40. When it is determined that the lens unit 10 is disengaged from the body unit 40, the step to be carried out proceeds to step S6, and the control flag F_Lens is reset (to "0"). Then, after the flag is reset, or when it is determined that the lens unit 10 is not disengaged from the body unit 40, the step to be carried out proceeds to step S7.

In step S7, the state of the camera operation switch 104 is detected. Then, in step S8, it is determined whether or not a first release switch (1st release SW) not shown, which is one of camera operation switches, is operated, i.e., it is turned on. When it is determined that the first release switch is turned on, the step to be carried out proceeds to step S9, and when it is determined that the first release switch is not turned on, i.e., it is in the OFF state, the step to be carried out returns to step S2.

In step S9, brightness information regarding the object is obtained from the photometry circuit 84. Then, the exposure time (Tv value) of the CCD unit 60 and the diaphragm set value (Av value) of the taking lens 12 are calculated from the brightness information. Next, in step S10, detection data of the AF sensor unit 52 is obtained through the AF sensor driving circuit 88. Based on this detection data, the amount of defocus is calculated.

Then, in step S11, the state of the control flag F Lens is checked. When the control flag F_Lens indicates "0", it means that the lens unit 10 is absent, and thus the following steps from step S12 onward cannot be carried out. Thus, in this case, the step to be carried out returns to step S2. On the other hand, when the control flag F_Lens indicates "1", the step to be carried out proceeds to step S12, and data indicating the amount of defocus is transmitted as data to the Lμcom 20, and the Lμcom 20 issues a command to drive the taking lens 12 in accordance with the amount of defocus.

Next, in step S13, it is determined whether or not a second release switch (2nd release SW) not shown, which is one of camera operation switches 104, is operated, i.e., it is turned on. When it is determined that the second release switch is turned on, the step to be carried out proceeds to step S14. On the other hand, when it is determined that the second release switch is not turned on, i.e., it is in the OFF state, the step to be carried out returns to step S2.

In step S14, data indicating the Av value is transmitted to the Lμcom 20 to instruct the Lμcom 20 drive the diaphragm 14. Then, in step S15, the quick return mirror 42 is moved to the retreat position, i.e., the photographing position, which is indicated by the chain double-dashed line in FIG. 2.

Next, in step S16, the front shutter of the focal-plane shutter 56 starts to run, and in step S17, the image processing controller 76 is made to execute an image pickup operation. When exposure to the CCD unit 60 is ended when time indicated by the Tv value lapses in step S18, the rear shutter of the focal-plane shutter 56 starts to run.

Then, in step S19, the quick return mirror 42 is driven to move to the observation position. Also, in parallel with this driving of the quick return mirror 42, the shutter 56 is charged.

In step S20, the Lμcom 20 is instructed to return the diaphragm 14 to an opening position. Then, in step S21, the image processing controller 76 is instructed to record image data obtained by photographing, on the recording medium 72. Then, when recording of the image data is completed, it is determined in step S22 whether photographing is completed or not. When it is determined that photographing is not completed, the step to be carried out returns to step S2, and the steps from step S2 onward are repeated. On the other hand, when it is determined that photographing is completed, the routine of the above operation ends.

In such a manner, according to the embodiment of the present invention, the AF sensor unit, photometry unit and image pickup unit can be arranged in small space in the finder optical system, and the optical sensors of these units can be provided close to the optical axes. Therefore, the finder optical system can be made to be more compact and have a wider field of vision, as a result of which the camera can be also made smaller and lighter.

It should be noted that the arrangement of the AF sensor unit 52, the photometry sensor 54 and the image pickup unit 80 is not limited to that shown in FIGS. 2 and 3. They may be interchanged, or may be located in rear of the back of the fourth mirror 48. In this case, it is preferable that the fourth mirror 48 be formed of a half mirror.

Further, setting of the AF sensor unit 52, the photometry sensor 54 and the image pickup unit 80 is not limited to the above. For example, if a contrast detection type AF is adopted in which the contrast of an image to be formed by the image pickup unit 80 is detected, and the taking lens is moved such that the contrast of the image is maximized, to thereby detect the position of the taking lens in which the contrast of the image is the maximum, the image pickup unit 80 can have an AF function in addition to an image pickup function. Also, the image pickup unit 80 can be made to have an photometry function in addition to the image pickup function.

Furthermore, in the embodiment, the second mirror 44 and the third mirror 46 are formed of half mirrors, and are fixed as shown in FIGS. 2 and 3. However, needless to say, any of these mirrors may be formed of a total reflection mirror, and be set to be rotatable as in the quick return mirror 42 rotatable to be retreated from the optical path, to thereby effect switching between the finder optical system and the optical sensor located in rear of the back of said any of the mirrors.

Figure 5:
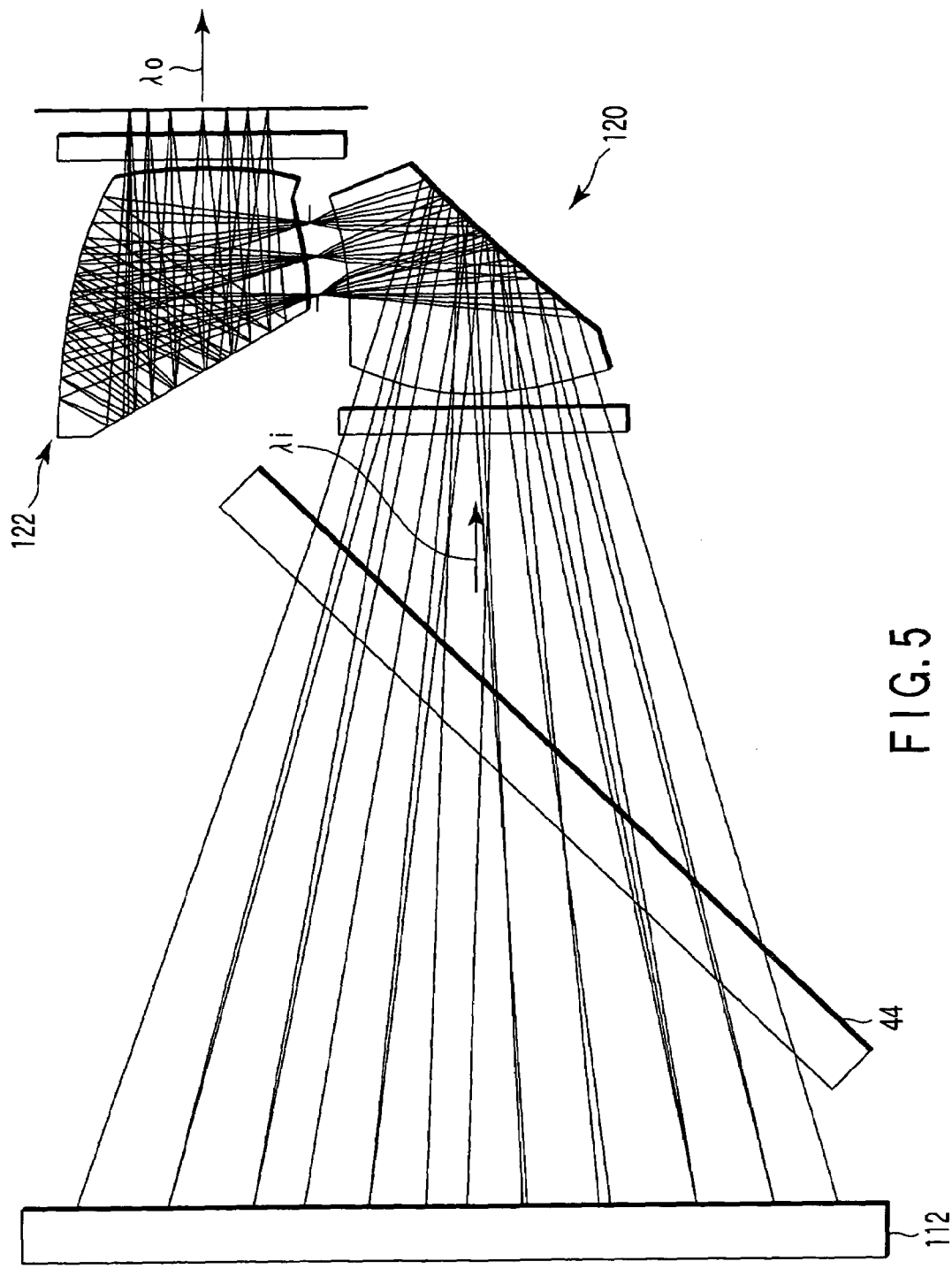
FIG. 5 is a view showing a modification of the embodiment of the present invention, in which free-surface prisms 120 and 122 are provided in an optical path extending to the image pickup unit 80.

FIG. 5 shows a modification of the embodiment of the present invention, in which an optical-path bending optical system comprising, e.g., free-surface prisms 120 and 122, is provided in an optical path from the second mirror 44 to the image pickup unit 80. Due to this structure, the image pickup unit can be made thinner.

FIG. 6 shows another modification of the embodiment of the present invention, in which the fourth mirror 48 is formed of a half mirror, and the image pickup unit 80 is provide in rear of the back of the fourth mirror 48. In rear of the back of the second mirror 44, the photometry sensor 54 is provided such that its receiving surface is perpendicular to the optical axis of the quick return mirror 42. In this case, it suffices that the AF sensor unit 52 is located in rear of the back of the quick return mirror 42 as in a conventional single-lens reflex camera. However, it is necessary that the quick return mirror 42 is formed of a half mirror. Due to this arrangement, the height of the camera is not increased.

The above explanations of the present invention are given by referring to the above embodiment. However, various modifications can be made without departing from the subject matter of the present invention.

Furthermore, the embodiment of the present invention is explained by referring to the digital camera by way of example. However, the present invention is not limited to the digital camera. It can be applied to a single-lens reflect camera using film.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera provided with an optical finder, comprising:
    a taking lens;
    a plurality of optical reflection surfaces which bend an optical axis of the taking lens at a substantially right angle to a longitudinal direction of the camera, and then further bend the optical axis of the taking lens a number of times, to thereby guide light traveling from the taking lens to an eyepiece, at least two of the plurality of optical reflection surfaces having light transmitting characteristics; and
    a plurality of optical sensors provided in rear of back sides of said at least two of the plurality of optical reflection surfaces which have the light transmitting characteristics.

2. The camera according to claim 1, wherein the plurality of optical sensors include a photometry sensor which detects brightness of an object to be photographed.

3. The camera according to claim 1, wherein the plurality of optical sensors include an AF sensor which detects a state of the taking lens with respect to focusing.

4. The camera according to claim 1, wherein the plurality of optical sensors include an image pickup device which picks up an image of an object to be photographed.

5. The camera according to claim 1, wherein the plurality of optical reflection surfaces include:
   a first optical reflection surface which reflects light transmitted through the taking lens, in a first direction which is coincident with the longitudinal direction of the camera, and which is substantially perpendicular to the optical axis of the taking lens;
   a second optical reflection surface which reflects the light reflected from the first optical reflection surface in a second direction substantially perpendicular to the first direction;
   a third optical reflection surface which reflects the light reflected from the second optical reflection surface in a third direction substantially perpendicular to the second direction; and
   a fourth optical reflection surface which reflects the light from the third optical reflection surface in a fourth direction substantially perpendicular to the third direction.

6. The camera according to claim 5, wherein the longitudinal direction of the camera is coincident with a longitudinal direction of an image pickup range of the camera.

7. The camera according to claim 1, wherein an amount of the light guided to the eyepiece by the plurality of optical reflection surfaces is less than 50% of an amount of light incident on the taking lens.

8. The camera according to claim 5, wherein the first optical reflection surface is a movable mirror, and the second to fourth optical reflection surfaces are fixed mirrors.

9. The camera according to claim 1, wherein the plurality of optical sensors receives at least light close to the optical axis of the taking lens.

10. A camera provided with an optical finder, comprising:
    a first optical reflection surface which reflects light transmitted through a taking lens, in a first direction which is coincident with a longitudinal direction of the camera, and which is substantially perpendicular to an optical axis of the taking lens;
    a second optical reflection surface which reflects from the light reflected from the first optical reflection surface in a second direction substantially perpendicular to the first direction;
    a third optical reflection surface which reflects the light reflected from the second optical reflection surface in a third direction substantially perpendicular to the second direction;
    a fourth optical reflection surface which reflects the light reflected from the third optical reflection surface in a fourth direction substantially perpendicular to the third direction; and
    a plurality of optical sensors,
    wherein at least two of the first to fourth optical reflection surfaces have light transmitting characteristics, and light transmitted through said at least two of the first to fourth optical reflection surfaces is incident on respective ones of the plurality of optical sensors.

11. The camera according to claim 10, wherein the plurality of optical sensors include a photometry sensor which detects brightness of an object to be photographed.

12. The camera according to claim 10, wherein the plurality of optical sensors include an AF sensor which detects a state of the taking lens with respect to focusing.

13. The camera according to claim 10, wherein the plurality of optical sensors include an image pickup element which picks up an image of an object to be photographed.

14. The camera according to claim 10, wherein the longitudinal direction of the camera is coincident with a longitudinal direction of an image pickup range of the camera.

15. The camera according to claim 10, wherein light guided to the eyepiece by the first to fourth optical reflection surfaces is less than 50% of light incident on the taking lens.

16. The camera according to claim 10, wherein the first optical reflection surface is a movable mirror, and the second to fourth optical reflection surfaces are fixed mirrors.

17. A camera provided with an optical finder, comprising:
    a taking lens which forms an optical image of an object to be photographed;
    a movable mirror which reflects light traveling from the taking lens in a longitudinal direction of the camera, which is substantially perpendicular to an optical axis of the taking lens;
    a screen provided on a reflection optical axis of the movable mirror and in an image formation position of the taking lens;
    a plurality of fixed mirrors provided in an observation optical path applied to observe an optical image on the screen, at least one of the plurality of fixed mirrors having light transmitting characteristics; and
    one or more optical sensors which receive light transmitted through said at least one of the plurality of fixed mirrors which has the light transmitting characteristics.

18. The camera according to claim 17, wherein said one or more optical sensors include an image pickup element which picks up an optical image corresponding to the optical image on the screen.

19. The camera according to claim 17, wherein said one or more optical sensors include a photometry sensor which measures brightness of the screen.

20. The camera according to claim 17, wherein said at least one of the plurality of fixed mirrors which has the light transmitting characteristics permits 50% or more of light incident on the taking lens to pass through said at least one of the plurality of fixed mirrors.

21. A camera provided with an optical finder, comprising:
    a first optical reflection surface which reflects light transmitted through a taking lens, in a first direction which is coincident with a longitudinal direction of the camera, and which is substantially perpendicular to an optical axis of the taking lens;
    a second optical reflection surface which reflects part of the light reflected from the first optical reflection surface in a second direction substantially perpendicular to the first direction, and which permits the other rest of the light reflected from the first optical reflection surface to pass through the second optical reflection surface;
    a third optical reflection surface which reflects the part of the light which is reflected from the second optical reflection surface in a third direction substantially perpendicular to the second direction;
    a fourth optical reflection surface which reflects part of the part of the light which is reflected from the third optical reflection surface, in a fourth direction substantially perpendicular to the third direction, and which permits the other rest of the part of the light which is reflected from the third optical reflection surface, to pass through the fourth optical reflection surface;

a first optical sensor which receives the part of the light which is transmitted through the second optical reflection surface; and a second optical sensor which receives the part of the light which is transmitted through the fourth optical reflection surface.

22. The camera according to claim 21, wherein the first optical sensor is a photometry sensor.

23. The camera according to claim 21, wherein the second optical sensor is an image pickup element.

* * * * *